United States Patent

McEwan

[11] 4,120,087
[45] Oct. 17, 1978

[54] METHOD OF SECURING A BATTERY TERMINAL TO AN EXTERNAL WALL

[75] Inventor: Keith John Bruce McEwan, Solihull, England

[73] Assignee: Joseph Lucas (Batteries) Limited, Birmingham, England

[21] Appl. No.: 724,458

[22] Filed: Sep. 17, 1976

Related U.S. Application Data

[60] Continuation of Ser. No. 514,941, Oct. 15, 1974, abandoned, which is a division of Ser. No. 336,711, Feb. 28, 1973, abandoned.

[51] Int. Cl.$^2$ ............................................. H01M 2/16
[52] U.S. Cl. ................................................. 29/623.2
[58] Field of Search ........................ 429/34; 29/623.2

[56] References Cited

U.S. PATENT DOCUMENTS

| | | | |
|---|---|---|---|
| 2,558,246 | 6/1951 | Gray | 136/135 S |
| 3,184,343 | 5/1965 | Shannon | 136/168 |
| 3,386,860 | 6/1968 | Maier | 136/176 |
| 3,388,005 | 6/1968 | Hahn et al. | 136/134 R |
| 3,468,720 | 9/1969 | Jensen | 136/170 |

*Primary Examiner*—John H. Mack
*Assistant Examiner*—H. A. Feeley
*Attorney, Agent, or Firm*—Holman & Stern

[57] ABSTRACT

An electric storage battery has a terminal bush located at one end within an aperture in an external wall of the battery. There is a clearance defined between a portion of the external wall around the aperture and the end of the bush extending into the aperture, and the clearance is occupied by a moulded filler material. Normally the external wall in which the bush is located is a lid closing an open end of the battery casing.

3 Claims, 2 Drawing Figures

METHOD OF SECURING A BATTERY TERMINAL TO AN EXTERNAL WALL

This is a continuation of application Ser. No. 514,941 filed Oct. 15, 1974 now abandoned which in turn is a divisional of Ser. No. 336,711 filed Feb. 28, 1973, now abandoned.

BACKGROUND OF THE INVENTION

This invention relates to electrical storage batteries and, in particular, to terminal bushes therefore and methods of securing terminal bushes to electric storage batteries.

SUMMARY OF THE INVENTION

According to one aspect of the present invention, there is provided a battery having a terminal bush located at one end with an aperture in an external wall of the battery, there being a clearance defined between a portion of said external wall around the aperture and the end of the bush extending into the aperture, said clearance being occupied by a moulded filler material.

Preferably, said moulded filler material is a synthetic plastics material.

Preferably, the battery includes a casing closed at an open end by a lid and said external wall is defined by the lid.

Most advantageously, the moulded filler material is extended internally of said external wall and configurated to provide a lead-in to assist, during assembly of the battery, in the location of an electrode post in a bore in the bush.

The present invention also provides a terminal bush and lid assembly as defined above and adapted to be employed in an electrical storage battery.

According to another aspect of the present invention, there is provided a method of securing a terminal bush to an external wall of an electric storage battery, said method including the steps of locating one end of the bush in an aperture in said external wall of the battery, there being a clearance between the bush and said wall, and filling the said clearance with a filler material by a moulding operation.

Preferably, the filler material is injection moulded. Most advantageously, the filler material is a synthetic plastics material, for example polypropylene.

Preferably also, the method includes the step of providing a lead-in for the terminal bush by employing a suitably configurated die member.

BRIEF DESCRIPTION OF THE DRAWINGS

An embodiment of the present invention will now be described, by way of example, with reference to the accompanying drawings, in which.

DETAILED DESCRIPTION OF A PREFERRED EMBODIMENT

Figure 1:
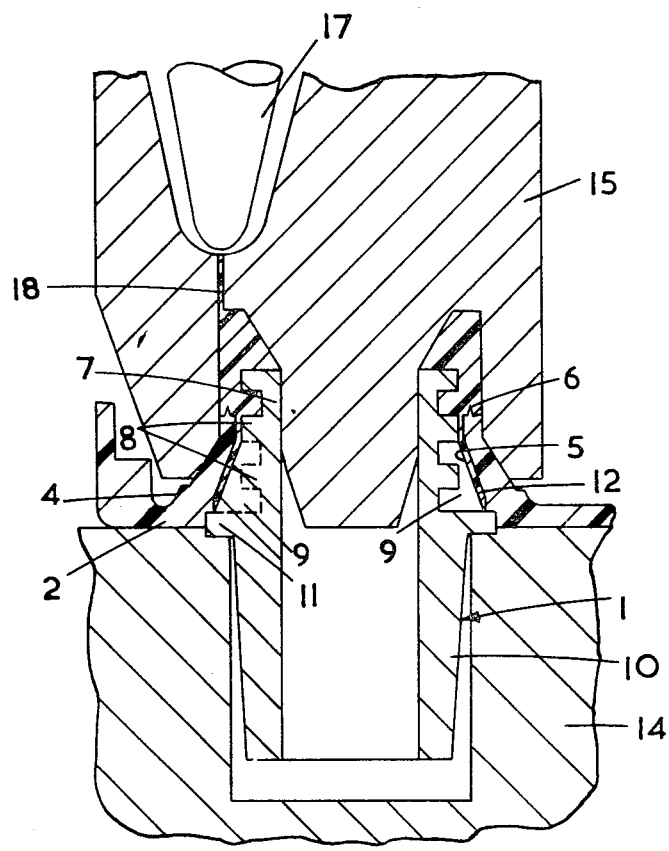
FIG. 1 is a sectional view showing one stage in the formation of a battery terminal bush and lid assembly according to the present invention.
Figure 2:
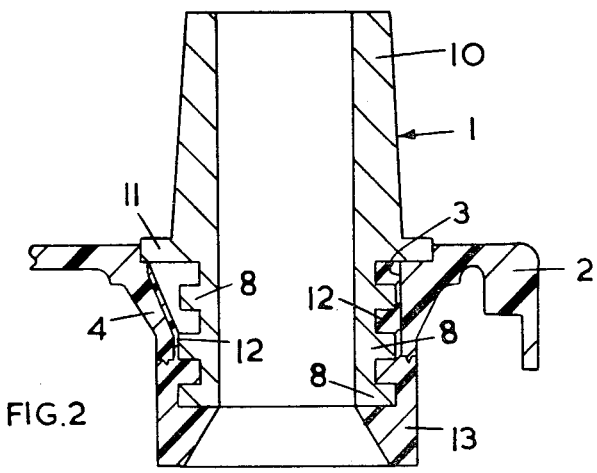
FIG. 2 is a sectional view showing part of a completed battery terminal bush and lid assembly so produced.

Referring to the drawings, the terminal bush and lid assembly is for an electrical storage battery of the type employed in motor vehicles and comprises a battery terminal bush 1 and a thermoplastic lid 2. The lid 2 has an aperture 3 therein which is extended inwardly of the lid 2 in a sleeve 4 integral with the battery lid 2. The battery lid 2 around the aperture 3 is provided with a series of four equally spaced rebates 5 (only two shown in FIG. 1 and only one shown in FIG. 2) around the periphery of the aperture 3. The inner end of the sleeve 4 is provided with an integral annular ridge 6.

The terminal bush 1 has a root portion consisting of a hollow sleeve 7 with a series of integral annular ribs 8 on its outer surface. At locations corresponding to the rebates 5, the sleeve 7 is provided with integral webs 9 (only one shown in FIG. 2). Between the sleeve 7 and a portion 10 of the bush 1 extending externally of the lid 2 there is provided an integral annular shoulder 11 which is accommodated in a recess in the lid 2 on the external surface thereof around the aperture 3.

The terminal bush 1 and lid 2 are so arranged that there is a clearance between them, said clearance being occupied by a moulded polypropylene filling 12 which also fills the spaces defined between the ribs 8 and provides a chamfered lead-in portion 13 to the hollow sleeve 7 internally of the lid 2.

To produce the terminal bush and lid assembly described above, the battery lid 2 and bush 1 are located in an inverted position (shown in FIG. 1) over a lower die 14. An upper die 15 is brought towards the die 14 so as to trap the bush 1 and lid 2 there between with a projection 16 on the upper die 15 entering the sleeve 7 of the bush 1. Polypropylene is then injected into the mould thus formed through an injector nozzle 17 and passage 18 so as to produce the moulded polypropylene filling 12. The moulding operation also produces the lead-in portion 13 due to the configurated arrangement of the upper die 15.

The annular ridge 6 is of thin section so that it will be thoroughly heated and wetted by the incoming molten material. In this way, there is a reduced risk of formation of a cold joint between the two plastics, such a cold joint leading to acid seepage through the joint and corrosion of the battery terminal in use.

It is to be appreciated that two of the above described terminal bushes 1 will be provided on each battery lid 2.

Toward the end of the assembly of the electrical storage battery, the battery lid 2 with the terminal bushes 1 attached is fitted in place relative to a battery casing (not shown) so that electrode posts connected to battery plates within the casing pass into the sleeves 7 respectively. This operation is assisted by the provision of the lead-ins 13. Finally, the electrode posts are secured in physical and electrical connection with their respective bushes 1 to complete the external terminals of the battery.

An advantage of the terminal bush and battery lid assembly described above is that it can be produced in a fully automatic process and that variations in clearance between the terminal bushes and the lids are automatically accommodated. Furthermore, it is found that a terminal bush having less lead therein can be employed compared with the terminal bushes employed with conventional methods which involve resistance welding of the terminal bush relative to the battery lid. Also, the method described above produces a good, liquid-tight seal between the lid and the terminal bush and enables a single lid construction to be used for a number of different terminal bush configurations.

It is to be appreciated that as an alternative to the example described above one or both of the terminal bushes could be provided on an external wall of the battery other than the lid, for example a side wall of the battery casing.

I claim:

1. A method of securing a battery terminal bushing to an external wall of an electric storage battery, said external wall being formed of a synthetic thermo plastic material, said method including the steps of:

locating one end of the terminal busing in an aperture in said external wall, there being a clearance between the bushing and said wall, said wall including an integral annular ridge extending around said aperture;

partially melting said integral annular ridge adjacent to said molten filler material by injection molding a molten synthetic plastic filler material into said clearance; and allowing said filler material to cool and solidify forming a liquid-tight joint between said filler material and said integral annular ridge.

2. A method as claimed in claim 1, wherein the battery includes a casing closed at an open end by a lid in said external wall as defined by said lid.

3. A method as claimed in claim 1, and including the further step of providing a lead-in for the terminal bush by employing a suitably configured die member during the melting operation.

* * * * *